Feb. 12, 1952     C. L. FAUDELL     2,585,235
SCANNING COILS FOR CATHODE-RAY TUBES
Filed July 26, 1949
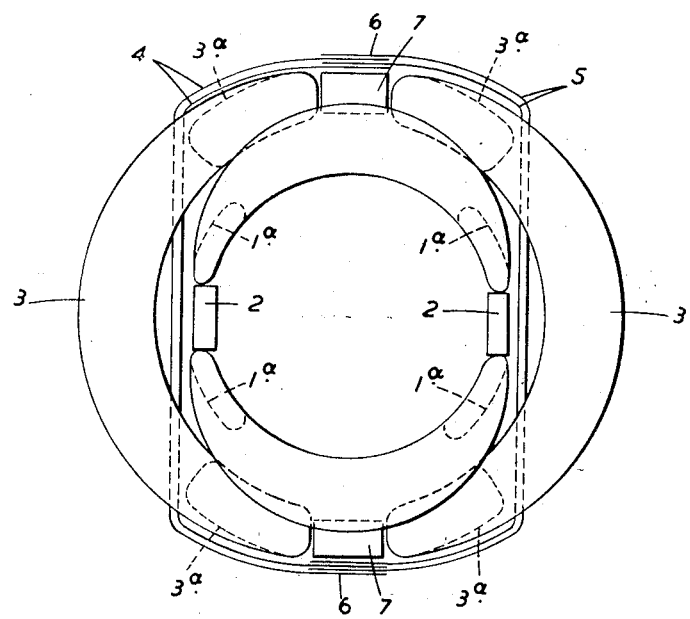
Inventor
C. L. FAUDELL
By J. C. Ollier
Attorney Patented Feb. 12, 1952

2,585,235

UNITED STATES PATENT OFFICE 2,585,235

SCANNING COILS FOR CATHODE-RAY TUBES

Charles Leslie Faudell, near Stoke Poges, England, assignor to Electric & Musical Industries Limited, Hayes, Middlesex, England, a company of Great Britain Application July 26, 1949, Serial No. 106,819
In Great Britain July 28, 1948

8 Claims. (Cl. 313—76)

This invention relates to scanning coils for cathode ray tubes such as are used for television purposes.

Usually in a cathode ray tube used for television purposes the electron beam is scanned across the screen of the tube in two mutual coordinate directions, one at line frequency and the other at frame frequency and for this purpose two pairs of scanning coils are sometimes employed, one pair serving to deflect the beam at line frequency and the other at frame frequency. One type of coil which is frequently used for scanning purposes is that known as a saddle coil in which the active conductors of the coil extend in an axial direction with respect to the axis of the coil assembly so that when mounted on the neck of a cathode ray tube said active conductors extend axially of the cathode ray tube. The line scan coils are arranged oppositely to one another and the frame scan coils are interposed between the line scan coils and are at 90° with respect thereto. In such coil arrangements as hereinbefore proposed and used the coils are usually surrounded by a magnetic sheath consisting of iron wire which is wound around the exterior of the coil assembly. In order to obtain a true rectangular raster and at the same time to provide for a minimum mutual inductance between the line and frame scan coils a very precise radial adjustment between the pairs of coils is necessary. Whilst such adjustment can be obtained by manual manipulation of the coils, such adjustment is difficult and tedious and, furthermore, when the wire sheath is wound on the adjusted coils some mechanical strain is imposed thereon which tends to disturb the alignment.

The object of the present invention is to provide an improved scanning coil assembly with a view to overcoming or reducing these difficulties.

According to one feature of the invention there is provided a coil assembly comprising pairs of saddle-type coils which are fixed relatively to one another and surrounded by a magnetic sheath which has regions spaced around its circumference having a different permeance compared with other regions whereby said regions can be adjusted relatively to said coils to provide a minimum mutual inductance if said fixed coils are not accurately arranged with their magnetic axes at right angles to one another.

According to another feature of the invention there is provided a coil assembly comprising pairs of saddle-type coils surrounded by a magnetic sheath which consists of a plurality of sections which overlap so as to provide regions of different permeance around said coil assembly and which are adjustable relatively to one another and to said coils whereby to permit of adjustment of the relative permeance of said regions and/or the positions of said regions relative to the coils.

In order that the said invention may be clearly understood and readily carried into effect, the same will now be more fully described with reference to the accompanying drawing, the single figure of which is an end view of a coil assembly according to the invention suitable for use with a cathode ray tube for example for television purposes.

The assembly comprises a pair of saddle coils 1 of which the outwardly turned ends are visible in the drawing, the bundles of conductors which when the assembly is in use extend parallel to the axis of the cathode ray tube and which are the active conductors of the coil being represented by dotted lines 1a. The two coils 1 are separated by insulating spacers 2. On the outside of the coils 1 is disposed a pair of saddle coils 3 the outwardly turned ends of which are visible in the drawing and the dotted lines 3a representing the conductor bundles which are parallel to the axis of the cathode ray tube as in the case of the coils 1. The coils 3 are separated by insulating spacers 7. In the arrangement shown the coils 3 are of larger diameter than coils 1 but if desired the coils 1 and 3 may be of substantially similar dimensions and the active conductors of the coils 3 being disposed in the spaces between the active conductors of the coils 1 in accordance with the well known arrangement. Instead of a wire sheath being wound around the assembly of coils a sheath is provided consisting of a plurality of radially superimposed sections 4 and 5 made from sheet metal. In the example shown two sections 4 and two sections 5 are provided although it will be appreciated that only one or more than two of said sections 4 and 5 may be employed. Each of said sections has an axial extent substantially equal to the length of the active conductors of the coil and each section is so dimensioned that the ends of the sections overlap one another as shown at 6. In the drawing the sections are shown spaced apart radially of the coil assembly for the purpose of clearness but in practice they would be in close contact with one another and the inner sections would be in close contact with the outer surfaces of the conductor bundles of coils 3, the sections being in fact assembled by wrapping them around the said conductor bundles. The sections are made from flexible sheet metal so that they conform to the contour of the said conductor bundles and assume the shapes shown in the drawing. Alternatively the sheath may conform to the surface of a cylinder of minimum diameter, by employing sections of substantially rigid material or by obtaining the cylindrical formation by employing suitable spacers or formers. In the regions 6 where the sections 4 and 5 overlap the permeance of the sheath at these regions is greater than at other parts of the sheath. The sheath as a whole is constructed so as to have an optimum permeance somewhat less than that necessary to provide maximum flux density in the sheath so that where the sections overlap the extra thickness of magnetic material in the region of the overlapping parts will increase the efficiency of the sheath at these regions. With an arrangement according to the invention it is possible to adjust the relative positions of the sections with respect to the coils and at the same time to adjust the degree of overlap between the sections 4 and 5.

It will be appreciated that upon a relative adjustment of the sections to vary their overlap in one sense in one of the said regions, the overlap in the other region is varied in the opposite sense, i. e. the relative permeance of said regions is varied. By suitably adjusting the sheath as a whole with respect to the coils the positions of said regions with respect to the coils are varied. It is thus possible to compensate for mutual inductance between the pairs of coils or for mismatch between the individual coils thus obtaining a truly rectangular raster. After suitable adjustments have been made to determine the most effective positions of the various sections the latter can be secured in their adjusted positions in any suitable manner, for example by means of adhesive tape wound over the sections, Whilst in the arrangement illustrated the sections each extend rather more than half way round the coils so that there is overlap only at diametrically opposite regions of the coil assembly, other arrangements may of course be provided for affording overlap at other regions. For example, the sheath may be formed by sections each of which extends rather more than a quarter of the way around the coil assembly so that there is overlap at two pairs of diametrically opposite regions spaced from one another by about 90°. The overlap may be greater or smaller than is shown in the drawing, for example, the degree of overlap may be of the order of 45°.

Instead of employing sections which conform to the coil assembly as shown, a plurality of partially cylindrical elements may be employed as aforesaid. For example, four partially cylindrical elements may be provided which are normally arranged with their centres 90° apart and the degree of overlap being somewhat less than 45°. It will be appreciated that the greater the degree of overlap the greater is the range of adjustment possible.

The sections of the sheath may be made from iron or other suitable material. In some cases it is advantageous to employ sections comprising layers of materials of different magnetic permeabilities, and said layers may be of different thicknesses. For example, in the case of a coil assembly employed with a television pick-up or reproducing tube, it is desirable that the sheath should have optimum permeability and resistivity at both the line and frame scanning frequencies. For this purpose the elements may be made from two layers of different materials which respectively have optimum permeability and resistivity at the line and frame frequencies.

What I claim is:

1. A coil assembly comprising pairs of relatively fixed saddle-type coils, a magnetic sheath surrounding said coils, said sheath consisting of a plurality of sections, said sections overlapping to provide regions of different permeances around said coils, and said sections being adjustable relatively to one another and to said coils to permit adjustment of the relative permeances of said regions and the positions of said regions relative to the coils.

2. A coil assembly comprising pairs of relatively fixed saddle-type coils, a magnetic sheath surrounding said coils and having regions with different permeances spaced around its circumference, said sheath being adjustable around said coils to provide a minimum mutual inductance between said coils when said fixed coils are not accurately arranged with their magnetic axes at right angles to one another.

3. A coil assembly according to claim 2, each of said sections comprising at least two layers of materials of different magnetic permeabilities.

4. A coil assembly comprising pairs of relatively fixed saddle-type coils, a magnetic sheath surrounding said coils, said sheath consisting of a plurality of sections, said sections overlapping to provide regions of different permeances around said coils, and said sections being adjustable relatively to one another to permit adjustment of the relative permeances of said regions.

5. A coil assembly according to claim 4, each of said sections comprising at least two layers of materials of different magnetic permeabilities.

6. A coil assembly comprising pairs of relatively fixed saddle-type coils, a magnetic sheath surrounding said coils, said sheath comprising a plurality of radially superimposed sections extending partly around said coils and overlapping with other sections to provide regions of different permeances around said coils, said sections being individually adjustable around said coils to permit adjustment of the degree of overlap of said sections and the positions of said overlapping sections with respect to said coils.

7. A coil assembly according to claim 6, each of said sections comprising at least two layers of materials of different magnetic permeabilities.

8. A coil assembly comprising pairs of relatively fixed saddle-type coils, a magnetic sheath surrounding said coils, said sheath consisting of a plurality of radially superimposed sections, said sections overlapping to provide regions of different permeances around said coils, and said sections being adjustable relatively to one another and to said coils, whereby the relative permeances of said regions and the positions of said regions relative to said coils may be adjusted.

CHARLES LESLIE FAUDELL.

REFERENCES CITED

The following references are of record in the file of this patent:

UNITED STATES PATENTS

| Number | Name | Date |
|---|---|---|
| 2,155,514 | Tolson et al. | Apr. 25, 1939 |
| 2,207,777 | Blain | July 16, 1940 |
| 2,240,606 | Bobb | May 6, 1941 |
| 2,333,806 | Maurer | Nov. 9, 1943 |
| 2,395,736 | Grundman | Feb. 26, 1946 |
| 2,428,947 | Torsch | Oct. 14, 1947 |

FOREIGN PATENTS

| Number | Country | Date |
|---|---|---|
| 106,025 | Sweden | Dec. 1, 1942 |